UNITED STATES PATENT OFFICE.

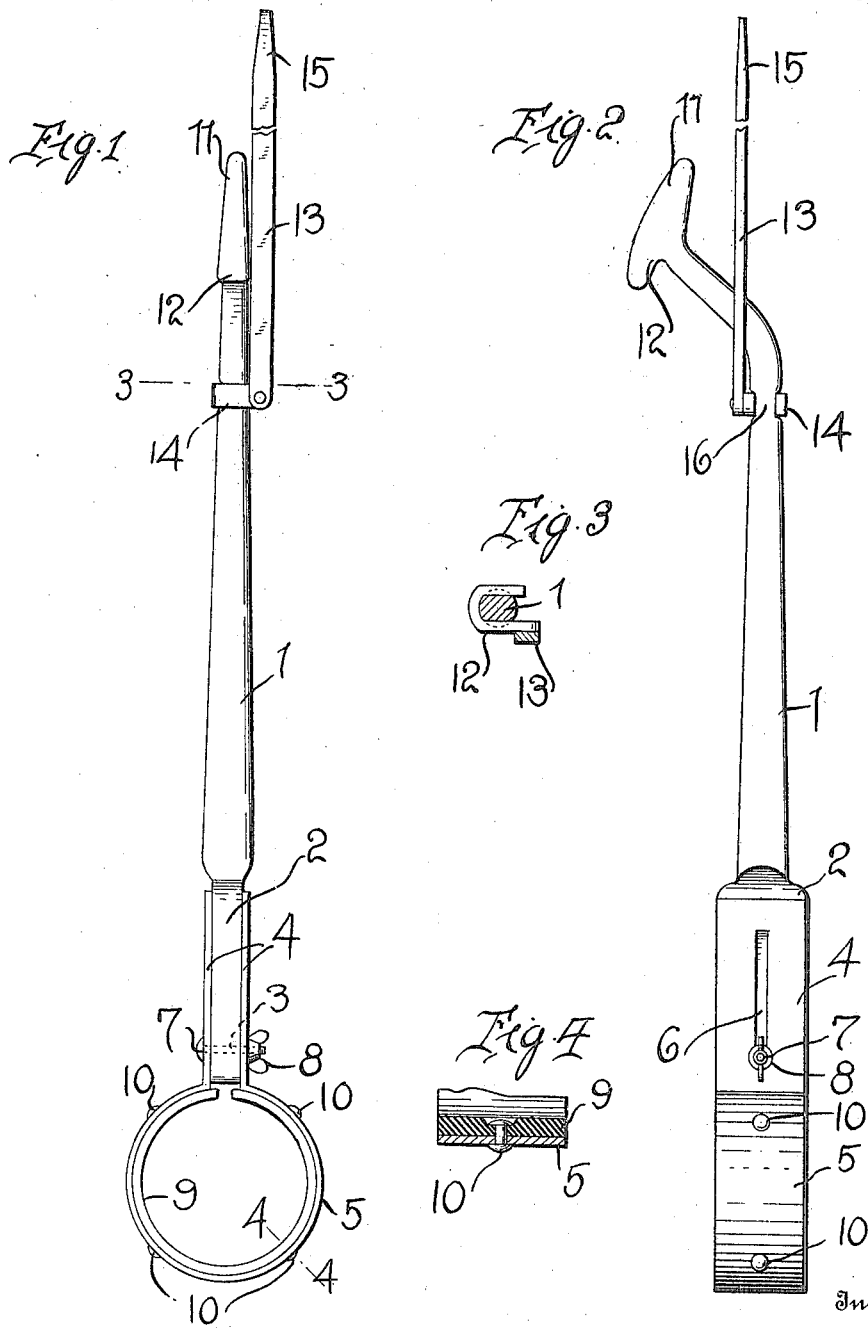

JOHN P. CUNNINGHAM, OF YORK, NEBRASKA.

TIRE-TOOL.

1,157,763. Specification of Letters Patent. Patented Oct. 26, 1915.

Application filed September 23, 1914. Serial No. 863,198.

*To all whom it may concern:*

Be it known that I, JOHN P. CUNNINGHAM, a citizen of the United States, residing at York, in the county of York and State of Nebraska, have invented certain new and useful Improvements in Tire-Tools, of which the following is a specification, reference being had to the accompanying drawings.

This invention relates to improvements in tire tools, and relates particularly to a tool of this character for use in connection with tires of the clencher type.

An object of this invention is the provision of a tire tool which is extremely simple in construction and efficient in use, by means of which a clencher tire may be readily removed from or replaced on a wheel.

A further object of the invention is the provision of a tool of the character above described having a head integrally formed at one end, the tool at the other end being engaged with the hub of the wheel, said head being so formed as to provide for either removing a tire from the wheel or replacing the tire thereon and in this connection to provide a detachable implement adapted, when detached, to be applied to the tire and initially detach the tire from the wheel to permit the insertion of the head of the main implement, the initial detaching implement being adapted to be attached to the main implement to form an extension thereof or handle, whereby the main implement may be rotated to remove the tire from the wheel.

Still another object in this connection is to so mount the auxiliary or initial detaching tool so that it may be swung out of the way when it is desired to start the replacing of the tire and then swung into its operative position again.

Still another object of the invention is the provision of a tire tool wherein the body of the tool is pivotally connected to the hub engaging portion thereof so as to be shifted laterally to thus permit the hub engaging portion be disposed further outward or further inward with relation to the tire to cause the implement to conform to various styles of wheels.

Still another object is to so construct the hub engaging portion of the implement that various size hubs may be engaged.

With these and other objects in view, my invention consists in the novel construction, combination and arrangement of parts, to be hereinafter more fully described, claimed and illustrated in the accompanying drawing, in which—

Figure 1 is a side elevational view of my improved tire tool; Fig. 2 is an edge view thereof; Fig. 3 is a sectional view on the line 3—3 of Fig. 1, and Fig. 4 is a sectional view on the line 4—4 of Fig. 1.

Referring more particularly to the drawing, the numeral 1 designates a bar, the inner end of which is flattened and widened as at 2, a transverse opening 3 being formed through the flattened portion of the bar adjacent its extremity. Arranged against the opposite faces of the flattened portion 2 are the parallel end legs 4 of a circular bearing member 5, each of the legs having a longitudinal slot 6 formed therein, the slots registering with the opening 3 to receive a connecting bolt 7 therethrough, the bearing member being secured in adjusted position on the flattened portion of the end bar by a wing nut 8 which is threadably mounted on the bolt. Arranged against the inner face of the bearing member 5 is a lining 9 of leather or other suitable soft material which is secured to the bearing member by rivets 10, the heads of which are countersunk in the lining, as clearly shown in Fig. 4 of the drawing.

The bar 1, opposite the hub-engaging portion, is laterally offset, and the extremity of this lateral offset portion is formed with the head 11. One face of this head extends nearly parallel to the shank of the bar 1, and the opposite face is downwardly and divergently inclined relative to the first-named face. The lower end of the head is formed with the heel 12, which extends below the deflected portion of the shank and the outer face of which is continuous with the outer face of the body of the head. It will also be seen that the head is rounded in contour so that it will not cut or otherwise damage the tire to which it is applied, and that the head may be formed, and preferably is formed, integral with the body of the bar 1. For use in connection with the bar 1 a member 13 is provided which constitutes a handle when attached to the bar and an initiative detaching tool when removed from the bar, the inner end of the lever having a hook 14 pivotally connected thereto, and the outer end of the lever being beveled as at 15. To receive the hook 14 on the inner end of the lever, the bar 1 adjacent the offset portion thereof is provided with a flattened portion 16, whereby the lever may be pivotally connected to the bar. It is to be noted that the bar 1 is pivotally connected by means of the bolt 7 with the tire engaging ring or bearing member 5 and thus, not only may the distance between the hub 11 and the engaging member be adjusted, but the bar 1 may be angularly adjusted relative to the engaging member, so that if the hub projects out to a considerable extent, the bar 1 may be turned toward the wheel, so as to engage with the tire thereof by thus connecting the bar 1 and the hub engaging member. I provide means whereby the implement may be applied to wheels, the hubs of which project out to a greater or less extent beyond the rims of the wheels.

In the practical use of my device, when it is desired to remove the clencher tire from a wheel, the beveled end 15 of the handle 14 is forced between one edge of the tire and the flange of the rim after the tire has been deflated, so that the edge of the tire may be raised high enough to allow the offset pointed end of the hub 11 of the bar 1 to be inserted between the edge of the tire and the flange of the rim. Upon moving the inner end of the bar toward the wheel, the lug 12 is forced inwardly behind the flange of the rim, and the bearing member 5 carried upon the inner end of the bar 1 is then engaged around the hub of the wheel so that the bar extends radially from the hub, and is rotatably mounted thereon. With the bar 1 in this position, the hook 14 of the member 13 is engaged with the flattened portion 16 of the bar, with the body portion of the lever arranged between the bar and the wheel. The lever 13 is then swung to engage the deflected portion of the bar, and the wheel is then held stationary, so that when the implement is moved circumferentially of the wheel, the wedge shaped or tapering head will force the outer edge of the tire from behind the flange of the rim, whereby the tire may be quickly and easily removed from the wheel. When the tool is used for replacing a tire, the bar is arranged with the bearing member engaging the hub, the hub 12 engaged behind the flange of the rim, and the margin of the tire bearing against the inner inclined face of the head 11, so that upon rotating the tool around the hub, the head 11 will force the tire into place on the rim. It is to be noted that the member 13 is pivotally mounted upon the clip or hook 14 so that when the tire is to be replaced on the wheel, the tire may be very readily lifted over the projecting outer end of the head 11 and disposed in place upon the rim with the outer marginal flange bearing against the inclined face of the head. If it were not for this pivotal connection, the member 13 would have to be entirely detached or the entire implement would have to be removed from the wheel and again put in place after the tire was seated upon the rim.

Having thus fully described my invention, what I claim and desire to secure by Letters Patent is:—

1. In a tire tool, a bar adapted to have rotative engagement with the hub of a wheel, the outer end of the bar being laterally deflected and formed with a head adapted to be engaged with a tire and with a heel adapted to engage with the flange of a rim, and an auxiliary tire detaching implement detachably engaged with the bar inward of the deflected portion and, when so engaged, bearing against the deflected portion to therefore form an extenson of the bar and a handle whereby the bar may be rotated.

2. In a tire tool of the character described, a bar, means on the inner end of the bar for engaging with the hub of a wheel, the outer end of the bar being laterally deflected and formed with a tire engaging head having a rim-flange engaging heel, a detachable clip carried upon the bar just inwardly of the deflected portion thereof, an auxiliary tire detaching implement pivoted to said clip and detachable therewith, said implement when turned against the deflected portion forming an extension of the bar and handle, whereby the bar may be rotated.

In testimony whereof I hereunto affix my signature in the presence of two witnesses.

JOHN P. CUNNINGHAM.

Witnesses:
C. F. STROMAN,
J. COX.